Jan. 24, 1961  G. F. W. POWELL  2,969,465
BALANCING UNIT FOR USE WITH RADIATION GAUGES
Filed May 15, 1957
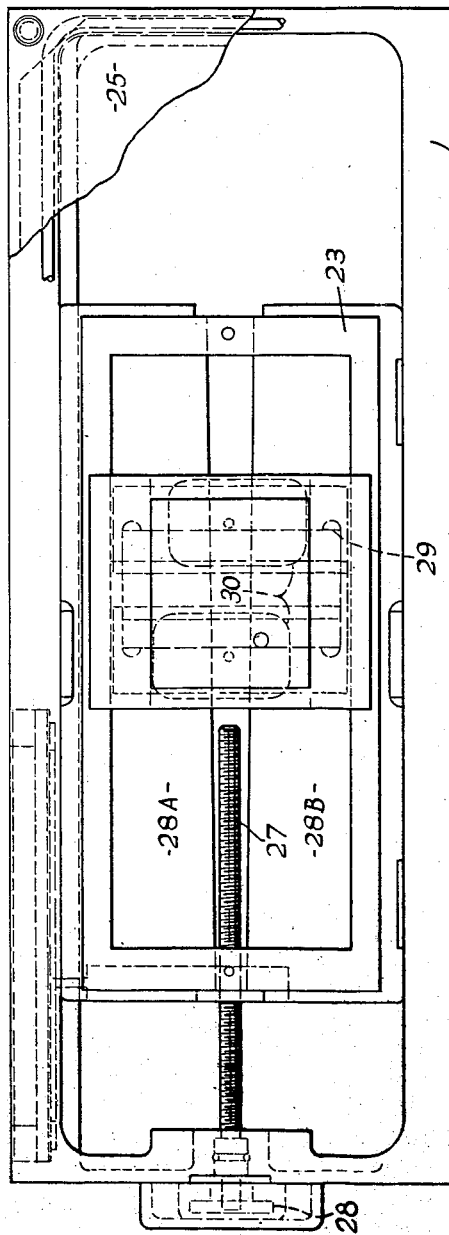
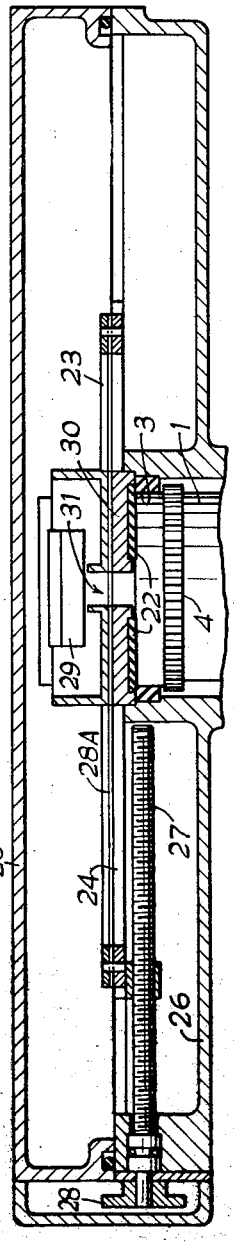
INVENTOR
Gordon F. W. Powell
BY
Watson, Cole, Grindle & Watson
ATTORNEYS

United States Patent Office 2,969,465
Patented Jan. 24, 1961

2,969,465

BALANCING UNIT FOR USE WITH RADIATION GAUGES

Gordon Francis Wellington Powell, Deptford, London, England, assignor to Molins Machine Company Limited, Deptford, London, England, a British company Filed May 15, 1957, Ser. No. 659,348

Claims priority, application Great Britain May 15, 1956

2 Claims. (Cl. 250—105)

This invention concerns a new or improved balancing unit for use with radiation gauges.

It is common with radiation gauges to provide a balancing unit which is similarly constructed to the gauge but has a definite material mass interposed between the source and the ionization chamber so that the current resulting from the whole arrangement is due to differences in the measured mass above or below the absorption value of said material mass. For example, in a radiation gauge used for measuring the mass of a moving tobacco filler, as is common in cigarette-making machines, the apparatus is so set up and adjusted that the currents from the scanning unit or gauge and the balancing unit are equal if the mass of the filler is correct so that the resulting current is zero. If the mass of the filler changes there is a small current due to the lack of balance. In the known art, the balancing unit has an absorber consisting of a piece of thin aluminum, and it has been proposed to arrange several pieces of varying thickness in a frame so that the operative mass could be changed, but the present invention provides an improved construction in which the effective value of the mass is adjustable to very close limits and this enabels balancing to be achieved with much greater accuracy and at the same time the aluminum parts providing said mass require no particular accuracy in manufacture.

According to the invention there is provided a balancing unit for use with a radio-active scanning device comprising a radio-active source and an ionization chamber and an absorber therebetween said absorber comprising a pair of thin metal plates spaced apart to define a converging aperture and means for moving said absorber across the path of the rays from the source to present different areas of metal and air in said path and thereby adjust the absorption of the rays by the interposed metal.

The invention will be further described with reference to the accompanying drawings in which:

Figure 1 is a longitudinal section of the upper part of a balancing unit;

Figure 2 is a plan of Figure 1 partly broken away.

Referring to Figure 1, part of an ionization chamber 1 similar to that described in the copending application Serial No. 659,325, filed May 15, 1957, is shown projecting into a hole in a casing member 26. The chamber has gear teeth 4 which can be rotated as described in said specification so as to rotate the chamber round its longitudinal axis, for the purpose explained in said specification, the chamber being supported resiliently so as to press the top against an insulating ring 22. The upper part of the chamber is formed by a ring 3, closed by a thin diaphragm which constitutes the window of the chamber, all as described in said specification. Above the ring 22 is a slide 23, which slides in grooves 24 in the casing 25—26. The slide 23 can be slid lengthwise, as will be seen from Figure 2, by a screw 27, which is rotated by a hand knob 28, the latter being secured within a cover to avoid interference by unauthorised persons. As can be seen from Figure 1, the slide 23 is in two parts and between them are thin aluminum sheets 28A and 28B. It will be observed from Figure 2 that the opposed edges of these sheets converge towards one another from the right-hand end to the left, and define a tapering air space, and thus if the slide is traversed by the screw there will be at the centre line a change in the length of metal and length of air extending along said centre line. The radio-active source 29 is mounted above the slide and the parts 28A and 28B are guided at the middle position between insulating members 30 so that at the aperture 31, Figure 1, the rays from the source are obstructed partly by the aluminum sheets and partly by the intervening air, and, as explained above, movement of the slide will alter the ratio between the amount of air and the amount of metal through which the rays have to pass. If, for any reason, it becomes necessary to remove the ionization chamber it is necessary to shield the source and this may be done in any suitable way, for instance, by a hinged flap which is under the influence of springs, and springs up to shield the source all as in said specification.

With the construction of ionization chamber and the arrangement of the balance unit above described, and a source accurately fixed in position with respect to its chamber, in the scanning device as well as in the balancing unit, the geometrical set-up of scanner and balancer is constant in each case and it is possible to calibrate the balancer to indicate the tobacco mass to which a particular setting of the balancer absorber corresponds. For this purpose a mark is made on the slide 23 which can be observed through a window to read against a scale made on the exterior of the casing 25. Conveniently the graduations show "weight in milligrams per centimetre" of filler length and a conversion chart may be provided with the apparatus to equate the scale readings to cigarettes per ounce for use in English-speaking countries.

As explained in the said copending specification the sensitivity of a chamber may be adjusted by rotating the chamber. When the plates of a chamber lie parallel to the filler, or absorber as the case may be, the effective aperture of the chamber is at a maximum. When they are at right-angles to filler or absorber, the aperture is at the minimum. Thus rotation of the chamber affords a very delicate means of adjusting the sensitivity of the chamber and in this way manufacture is expedited, since the accuracy of operation can be ensured by rotation of the chambers. Accuracy of setting of the chamber of the scanning unit is of importance to the present invention because of the calibration mentioned above.

As explained above, the balancing unit can be accurately set to be equivalent to a desired mass but it is necessary to check the whole apparatus periodically particularly in view of source decay, although this is slow.

As a general policy a daily check is desirable to see that the apparatus is functioning correctly.

What I claim as my invention and desire to secure by Letters Patent:

1. A balancing unit for use with a radio-active scanning device comprising a radio-active source and an ionization chamber and an absorber therebetween, said absorber comprising a pair of thin metal plates spaced apart to define therebetween an elongated aperture, the adjacent edges of said plates converging slightly lengthwise of the aperture, and means for moving said absorber across the path of the rays from the source and in the direction of the length of the aperture to present different areas of metal in said path and thereby adjust the absorption of the rays by the interposed metal.

2. A balancing unit as claimed in claim 1 wherein the thin metal plates are supported in a slide movable in guides across the top of the chamber.

References Cited in the file of this patent

UNITED STATES PATENTS

| | | |
|---|---|---|
| 2,224,077 | Haupt et al. | Dec. 3, 1940 |
| 2,295,975 | Storm | Sept. 15, 1942 |
| 2,492,031 | Blatz et al. | Dec. 20, 1949 |
| 2,670,443 | Pennock et al. | Feb. 23, 1954 |
| 2,798,958 | Hudson et al. | July 9, 1957 |